May 9, 1950 — D. TERRY — 2,507,187

SCORING TOOL

Filed Jan. 4, 1947

INVENTOR.
David Terry,
BY George D. Richards,
Attorney

Patented May 9, 1950

2,507,187

UNITED STATES PATENT OFFICE 2,507,187

SCORING TOOL

David Terry, Orange, N. J.

Application January 4, 1947, Serial No. 720,167

1 Claim. (Cl. 49—52)

This invention relates to an improved tool for scoring or scribing ampul necks, tubes or rods of glass or other frangible materials, or the like, preparatory to and whereby to facilitate parting or breaking apart thereof.

The invention has for an object to provide a simple scoring or scribing tool comprising a tongs-like structure having opposed arms, one of said arms being provided with means to seat or support the article or material to be operated upon, and the other said arm being provided with a scoring or scribing member or element to operatively engage said article or material.

The invention has for another object to provide a novel scoring or scribing tool of the character above stated wherein the arms of the tongs-like structure are so resiliently biased in relation one to the other that the seating or supporting means and the scoring or scribing member or element are urged one toward the other, and in such manner that the scribing or scoring member or element is automatically pressed, with scribing or scoring effect, against an article or material embraced by the seating or supporting means, so that effective scribing or scoring action is obtained merely by rotating the interposed article or material as thus engaged.

Other objects of this invention, not at this time more particularly enumerated, will be understood from the following detailed description of the same.

Illustrative embodiments of the invention are shown in the accompanying drawings, in which.

Similar characters of reference are employed in the above described views, to indicate corresponding parts.

Figure 1:
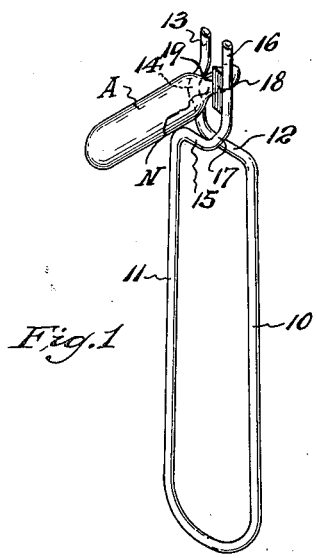
Fig. 1 is a perspective view of the scoring or scribing tool according to this invention, as operatively applied to the neck of an ampul desired to be scored or scribed to facilitate breaking off a closure end thereof.
Figure 2:
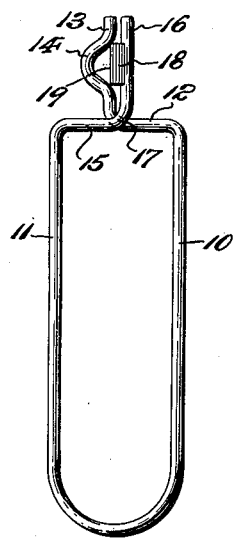
Fig. 2 is a face view of the novel scoring or scribing tool.
Figure 3:
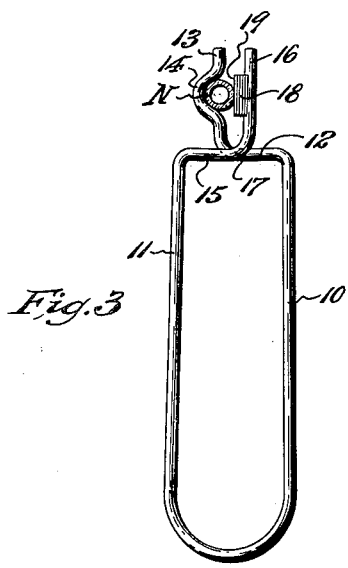
Fig. 3 is a similar view of the same as applied in use to an article or material to be operated upon, the latter being shown in cross section.
Figure 4:
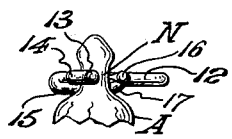
Fig. 4 is a top end elevational view of the tool as operatively applied to an article or material to be operated upon, such e. g. as the neck of an ampul.

Referring to the drawings, the novel scoring or scribing tool according to this invention comprises a tongs-like body which is formed from a length of resilient wire doubled upon itself to provide a pair of arms 10 and 11. One arm of the tongs-like body, e. g. the arm 10, is provided with an inwardly directed, transverse angular extension 12 which terminates in an upstanding or perpendicular jaw member 13. Said jaw member 13 is formed to provide an outwardly bowed or arcuate portion 14, the interior of which provides a work seating or supporting means adapted to embrace and back the article or material desired to be operated upon by the tool. The other arm of the tongs-like body, e. g. the arm 11, is also provided with an inwardly directed, transverse angular extension 15 which terminates in an upstanding or perpendicular jaw member 16. Said jaw member 16 is connected with the angular extension 15 by an offsetting portion 17, whereby to align the jaw member 16 in the plane of and in opposition to the jaw member 13 of the opposite arm 10 of the tongs-like body. Affixed to said jaw member 16, to project inwardly therefrom, and in opposition to the work seating or supporting means 14 of the opposite jaw member 13, is a scoring or scribing member or element 18. In one form thereof, said scoring or scribing member or element 18 comprises a cutter made of a suitable hard metal or metallic alloy, such e. g. as tungsten carbide; the same being provided with a sharpened cutting edge 19 which is directed toward the work seating or supporting means 14. When thus made of metal or metallic alloy, the scoring or scribing member or element 18 may be rigidly secured to the jaw member 16 by brazing or welding the same thereto, so as to be unitary therewith as shown in Figs. 1 to 4 inclusive. Other methods of mounting and securing the scoring or scribing member or element 18 to the jaw member 16 may be employed, examples of which will be subsequently herein referred to.

In the use of the tool, assuming for example it is desired to score or scribe the neck N of a glass ampul A preparatory to breaking off the closure end thereof, the arms 10 and 11 of the tool are pressed toward each other against their inherent biasing tension, whereby, since the extensions 12 and 15 cross each other, the jaw members 13 and 16 are caused to move apart so that the neck N of the ampul A can be inserted therebetween. When thereafter the arms 10 and 11 are released so as to spread apart under their inherent biasing tension, the crossed extensions 12 and 15 will also be outwardly drawn in opposite directions, whereupon the jaw members 13 and 16 will be moved one toward the other. Such relative movement of the jaw members 13 and 16 causes the work seating or supporting means 14 to embrace the ampul neck N at one side thereof, whereby to hold and guide the same when it is rotated about its longitudinal axis, while at the same time causing the cutting edge 19 of the scoring or scribing member or element 18 to operatively engage the opposite side of the ampul neck. When the ampul is thus operatively engaged by the tool, an annular scoring or scribing of the ampul neck N may be produced by merely rotating the ampul about its longitudinal axis, since the pressure exerted by the biasing tension of the arms 10 and 11 is sufficient to cause the cutting edge 19 of the scoring or scribing member or element 18 to effectively cut into and score the external surface of the ampul neck. After such scoring of the ampul neck is produced, the ampul is removed from the tool by again separating the jaw members 13 and 16, and, after removal, the closure end of the ampul may be easily and cleanly broken off at the part of the neck which has been weakened by the scoring, without splintering or other undesirable fragmentation of the ampul glass. It will therefore be apparent that the ampul may thus be safely opened for discharge and use of its content.

It will be obvious that the tool may be similarly used for scoring other articles, tubes or rods of glass or other frangible materials, or the like.

It will be understood that the wire or like material from which the tongs-like body and its parts is made may be of any desired cross sectional shape, i. e. round, square or of other polygonal cross section.

Figures 5, 6:
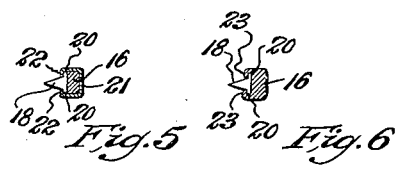
Figs. 5 and 6 are fragmentary cross sectional views of the jaw member of the tool which carries the scoring or scribing member or element of the tool, said views respectively showing optional methods of coupling the latter to the former.

As above mentioned, the scoring or scribing member or element 18 may be secured to the carrying arm 16 by brazing, welding or riveting the same thereto, or by other forms of mechanical coupling of these parts. Illustrative of some among other various methods which may be pursued are the following:

As shown in Fig. 5, the scoring or scribing member or element 18 can be provided along opposite base margins thereof with projecting lips 20, and then the base of the member or element can be footed upon a face of the jaw member 16, and secured in fixed assembled relation to the latter by a coupling sleeve 21, disposed to envelop said jaw member with its free edge portions 22 turned over and into holding and anchoring relation to said lips 20. Again, as shown in Fig. 6, the member or element 18, as provided with the marginal lips 20, can be footed upon a face of the jaw member 16, and thereupon portions 23 of the jaw member metal swaged or clinched over said lips into holding and anchoring relation thereto.

Figure 7:
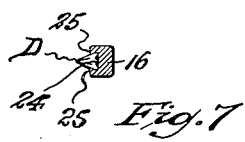
Fig. 7 is a similar view showing the mounting of a diamond on a jaw member of the tool for service as the scoring or scribing member or element.

In Fig. 7 is shown an alternative kind of scoring or scribing member or element, the same comprising a diamond D having its base countersunk in a receiving socket 24 with which the jaw member 16 is provided, the marginal portions 25 of said socket being thereupon swaged or clinched over and around the diamond body to rigidly set and hold the same to the jaw member; or the diamond may be secured to the jaw member 16 in any other suitable manner.

Having now described my invention, I claim:

A scoring tool for the purposes described comprising a single length of spring wire doubled upon itself to provide a handle portion including a pair of arms resiliently biased to move outwardly away one from the other, outer end portions of said arms being bent inwardly whereby to form therefrom respective angular extensions relatively disposed to cross one another, said extensions each terminating in an end portion integral therewith and extending outwardly therefrom substantially parallel to the longitudinal axis of the handle portion whereby to form opposed jaw members biased by the handle portion to move one toward the other, a scoring blade affixed to one of said jaw members to extend longitudinally along the same and disposed to project toward the other jaw member in a plane parallel to the transverse plane of the handle portion, and an intermediate portion of said other jaw member being outwardly bowed to form an arcuate seating portion opposed to said scoring blade in the plane thereof, said seating portion being adapted to support the work subject to the scoring action of the scoring blade when the work is rotated between the closed members.

DAVID TERRY.

REFERENCES CITED

The following references are of record in the file of this patent:

UNITED STATES PATENTS

| Number | Name | Date |
|---|---|---|
| 454,233 | Smith | June 16, 1891 |
| 505,211 | Adams, Jr. | Sept. 19, 1893 |
| 1,979,528 | Bruce et al. | Nov. 6, 1934 |